United States Patent
Burnett et al.

(10) Patent No.: US 7,808,134 B2
(45) Date of Patent: Oct. 5, 2010

(54) ACTIVE CONTROL MOUNT MAGNETIC OPTIMIZATION FOR AN ENGINE

(75) Inventors: Keith Burnett, Chatham (CA); Bernard J. Hrytzak, Chatham (CA); Alfred J. Whitman, Chatham (CA)

(73) Assignee: Continental Automotive Canada, Inc., Chatham, Ontario (CA)

(*) Notice: Subject to any disclaimer, the term of this patent is extended or adjusted under 35 U.S.C. 154(b) by 284 days.

(21) Appl. No.: 11/806,563

(22) Filed: Jun. 1, 2007

(65) Prior Publication Data
US 2007/0290581 A1     Dec. 20, 2007

Related U.S. Application Data

(60) Provisional application No. 60/804,997, filed on Jun. 16, 2006.

(51) Int. Cl.
    *H01F 7/08*     (2006.01)
(52) U.S. Cl. .................. 310/14; 310/23; 251/129.15; 123/90.16
(58) Field of Classification Search ............ 310/23, 310/49 R, 14; 335/281; 137/550; 123/90.16; 251/129.15; *H01F 7/08*
See application file for complete search history.

(56) References Cited

U.S. PATENT DOCUMENTS

| | | | | |
|---|---|---|---|---|
| 5,565,832 A | * | 10/1996 | Haller et al. | 335/249 |
| 6,076,550 A | * | 6/2000 | Hiraishi et al. | 137/550 |
| 6,527,262 B2 | | 3/2003 | Hagino et al. | |
| 6,611,186 B2 | * | 8/2003 | Hanson et al. | 335/220 |
| 6,641,120 B2 | * | 11/2003 | Nemoto | 267/140.14 |
| 6,787,946 B2 | * | 9/2004 | Delaire et al. | 310/14 |
| 6,867,512 B2 | * | 3/2005 | Delaire et al. | 310/14 |
| 7,066,454 B2 | * | 6/2006 | Kon et al. | 267/140.14 |
| 7,157,821 B2 | * | 1/2007 | Kon et al. | 310/71 |
| 7,209,020 B2 | * | 4/2007 | Telep | 335/255 |
| 7,554,429 B2 | * | 6/2009 | Kon | 335/278 |
| 7,564,332 B2 | * | 7/2009 | Telep | 335/255 |
| 2003/0094535 A1 | * | 5/2003 | Schmidt | 242/603 |

OTHER PUBLICATIONS

Co-pending U.S. Appl. No. 11/882,615, filed on Aug. 3, 2007.

\* cited by examiner

*Primary Examiner*—Quyen Leung
*Assistant Examiner*—Terrance Kenerly

(57) ABSTRACT

A solenoid (10) includes a shell (12), a lower stator member (20) associated with the shell, and an upper stator member (30) in the shell. The upper stator member is separate from the lower stator member and has a wire receiving member (34). A half bobbin (40) is associated with the upper stator member and has a wire receiving portion (44). Wire is wound directly about the portion of the half bobbin and directly about the member of the upper stator member to define a winding (46). An armature (54) is movable with respect to at least the lower stator member upon energizing the winding.

20 Claims, 1 Drawing Sheet

ACTIVE CONTROL MOUNT MAGNETIC OPTIMIZATION FOR AN ENGINE

This application claims the benefit of the earlier filing date of U.S. Provisional Application No. 60/804,997, filed on Jun. 16, 2006, and claims the benefit thereof for priority purposes.

FIELD OF THE INVENTION

The invention relates to an active control mount for an engine of a vehicle and, more particularly, to an improved solenoid for the active control mount.

BACKGROUND OF THE INVENTION

An active control mount for an engine of a vehicle is employed during engine cylinder deactivation. When cylinders are deactivated, the vibration of the engine increases. A solenoid of the active control mount is controllable to permit the active control mount to dampen this vibration. The electrical signal to the solenoid is dependent upon the engine conditions.

There is a need to provide a solenoid for an active control mount that provides higher magnetic forces than conventional solenoids so as to overcome and dampen higher levels of vibration.

SUMMARY OF THE INVENTION

An object of the invention is to fulfill the need referred to above. In accordance with the principles of the present invention, this objective is obtained by providing a solenoid including a shell, a lower stator member associated with the shell, and an upper stator member in the shell. The upper stator member is separate from the lower stator member and has a wire receiving member. A half bobbin of the solenoid is associated with the upper stator member and has a wire receiving portion. Wire is wound directly about the portion of the half bobbin and directly about the member of the upper stator member to define a winding. An armature is movable with respect to at least the lower stator member upon energizing the winding. Since the winding is wound directly about the member of the upper stator member, increased magnetic forces are possible.

In accordance with another aspect of the disclosed embodiment, a method of provides a solenoid having an upper stator member; a lower stator member separate from the upper stator member, the upper stator member having a wire receiving member; a half bobbin associated with the upper stator member, the half bobbin having a wire receiving portion; and an armature. In accordance with the method, wire is wound directly about the portion of the half bobbin and directly about the member of the upper stator member to define a winding.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
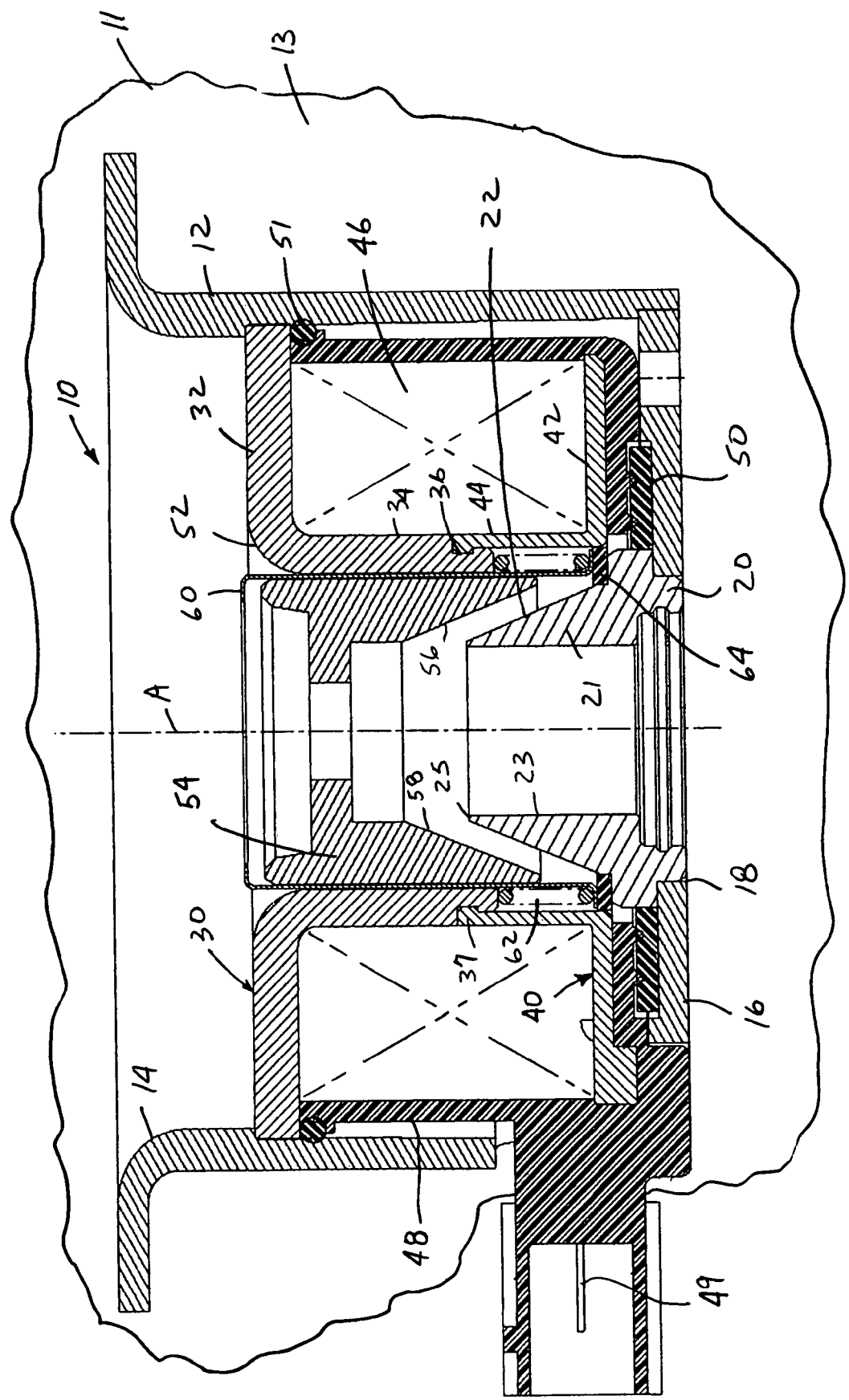
FIG. 1 is a sectional view of a solenoid disposed in an active control mount for an engine of a vehicle provided in accordance with an embodiment of the present invention.

With reference to FIG. 1, a solenoid, disposed in an active control mount 11 of an engine of a vehicle, is shown generally indicated at 10, in accordance with an embodiment of the invention. The solenoid 10 is provided in a body 13 of the mount 11 and includes a housing or shell 12 of generally cylindrical configuration having an opened end 14 and an opposing end 16 having an opening 18 therein. A lower stator member 20 extends through the opening 18. A portion 21 of the lower stator member 20 includes an outer tapered surface 22 and an internal, generally cylindrical surface 23 that define a tip 25, the function of which will be explained below.

An upper stator member, generally indicated at 30, is provided in the shell 12 and has a generally cylindrical base 32 of a first diameter and a wire receiving member preferably in the form of a generally cylindrical end 34. The end 34 has a diameter less than the first diameter. The length of the end 34 of the upper stator member 30 increases the magnetic force generated, as will become more apparent below. The upper and lower stator members 20 and 30 are of ferrous material.

The end 34 of the upper stator member 30 includes an annular groove 36 receiving a portion 37 of a half bobbin, generally indicated at 40. Thus, the half bobbin 40 includes only one base member 42 and a wire receiving portion preferably in the form of a cylindrical portion 44 extending from the base member 42. The base member 42 is generally cylindrical and has a diameter greater than the diameter of the cylindrical portion 44. The outer periphery of the end 34 of the upper stator member 30 is generally flush with the outer periphery of the cylindrical portion 44 of the half bobbin 40. A copper wire is wound directly upon the end 34 of the upper stator member 30 and directly upon the cylindrical portion 44 of the half bobbin 40 to define a winding 46. Since there is only a half bobbin 40, the winding 46 is disposed directly over the end 34 of the upper stator member 30 between the base 32 and the base 42 of the half bobbin 40. Since the winding 46 is close to the upper stator 30, higher magnetic forces are possible.

An overmold 48 is provided over the winding 46 and at least portions of the base member 42 of the half bobbin 40 to prevent moisture from getting to the copper wire of the winding 46. In particular, plastic material is molded over these components. The overmold 48 also defines a connector that protects terminals 49 for powering the winding 46. A gasket 50 is provided between the overmold 50 and the shell 12 stator member and an O-ring 51 is provided between the overmold 50, the upper stator member 30 and shell 12.

With reference to FIG. 1, the upper stator member 30 includes an opening 52 that receives an armature 54 and a sleeve 60. The armature 54, preferably of cold rolled steel, is movable axially (with respect to axis A) within the sleeve 60. The sleeve 60 provides a smooth generally cylindrical surface adjacent to the generally cylindrical periphery of the armature 54. The sleeve 60 also provides an air gap between the armature 54 and stators, 20, 30. A coil spring 62 is provided between the upper stator member 30 and an end of the sleeve 60 to bias the sleeve 60 against a gasket 64.

When the winding 46 is energized, preferably with a pulse width modulated signal, a magnetic field is generated and the armature 54 is attracted to the lower stator member 20 (the armature moves downwardly in FIG. 1). The armature 54 is attached to a diaphragm (not shown) in the active control mount 11. The mount is oil filled. Moving the armature 54 changes the volume in the mount 11, which changes the dampening factor of the oil (low frequency noise) and the pulses dampen the high frequency noise. An example of this type of active control mount is disclosed in U.S. Pat. No. 6,527,262, the content of which is hereby incorporated into this specification by reference.

The armature 54 includes an inner tapered surface 56 and defining a recess 58 such that when the armature 54 moves towards the lower stator member 20, the tapered surface 22 of the lower stator member 20 is generally adjacent to the tapered surface 56 of the armature 54, with the recess 58 receiving the tip 25 of the lower stator member 20. Thus, the tip 25 is disposed generally adjacent to an armature 54 to reduce magnetic saturation and provide a higher magnetic field force for the solenoid 10.

The next generation of active control mounts requires much higher magnetic forces in the solenoid to overcome higher levels of vibration. The solenoid 10 provides such higher forces due to the configuration of the upper and lower stator members 20, 30 and the close proximity of the winding 46 to the upper stator member 30.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A solenoid comprising:
a shell,
a lower stator member associated with the shell,
an upper stator member in the shell, the upper stator member being separate from the lower stator member, the upper stator member having a wire receiving member,
a half bobbin associated with the upper stator member and separate there-from, the half bobbin having a wire receiving portion,
wire wound directly about the portion of the half bobbin and directly about the member of the upper stator member to define a winding, and
an armature magnetically attractable to at least the lower stator member upon energizing the winding.

2. The solenoid of claim 1, wherein the member of the upper stator member is generally cylindrical and the upper stator member includes a generally cylindrical base coupled with the member, the base having a diameter larger than a diameter of the member.

3. The solenoid of claim 2, wherein the portion of the half bobbin is generally cylindrical and the half bobbin has a generally cylindrical base member coupled with the portion, the base member having a diameter greater than the diameter of the portion, the winding being disposed between the base member of the half bobbin and the base of the upper stator member.

4. The solenoid of claim 1, wherein the member of the upper stator member has an annular groove, a part of the wire receiving portion of the half bobbin being received in the groove.

5. The solenoid of claim 1, wherein an outer periphery of the member of the upper stator member is generally flush with an outer periphery of the portion of the half bobbin.

6. The solenoid of claim 1, wherein the lower stator member has a portion that includes an outer tapered surface and an internal, generally cylindrical surface that define a tip, the tip being generally adjacent to the armature.

7. The solenoid of claim 6, wherein the armature has an inner tapered surface such that when the armature moves towards the lower stator member, the inner tapered surface is generally adjacent to the outer tapered surface of the lower stator member.

8. The solenoid of claim 1, wherein the upper stator member includes an opening therein, the armature being disposed in the opening.

9. The solenoid of claim 8, wherein the armature has a generally cylindrical periphery, the solenoid further comprising a sleeve in the opening between the upper stator member and the armature, the sleeve having a generally cylindrical inner surface adjacent to the periphery of the armature.

10. The solenoid of claim 1, further comprising a plastic material molded over the winding and at least a portion of the half bobbin.

11. An active control mount of an engine of a vehicle, the mount comprising:
a body, and
a solenoid mounted within the body, the solenoid comprising:
a shell,
a lower stator member associated with the shell,
an upper stator member in the shell, the upper stator member being separate from the lower stator member, the upper stator member having a wire receiving member,
a half bobbin associated with the upper stator member and separate there-from, the half bobbin having a wire receiving portion,
wire wound directly about the portion of the half bobbin and directly about the member of the upper stator member to define a winding, and
an armature magnetically attractable to at least the lower stator member upon energizing the winding.

12. The mount of claim 11, wherein the member of the upper stator member is generally cylindrical and the upper stator member includes a generally cylindrical base coupled with the member, the base having a diameter larger than a diameter of the member.

13. The mount of claim 12, wherein the portion of the half bobbin is generally cylindrical and the half bobbin has a generally cylindrical base member coupled with the portion, the base member having a diameter greater than the diameter of the portion, the winding being disposed between the base member of the half bobbin and the base of the upper stator member.

14. The mount of claim 11, wherein the member of the upper stator member has an annular groove, a part of the wire receiving portion of the half bobbin being received in the groove.

15. The mount of claim 11, wherein an outer periphery of the member of the upper stator member is generally flush with an outer periphery of the portion of the half bobbin.

16. The mount of claim 11, wherein the lower stator member has a portion that includes an outer tapered surface and an internal, generally cylindrical surface that define a tip, the tip being generally adjacent to the armature.

17. The mount of claim 16, wherein the armature has an inner tapered surface such that when the armature moves towards the lower stator member, the inner tapered surface is generally adjacent to the outer tapered surface of the lower stator member.

18. A method of providing a solenoid, the method comprising the steps of:
providing:
an upper stator member;
a lower stator member separate from the upper stator member, the upper stator member having a wire receiving member;

a half bobbin associated with the upper stator member and separate there-from, the half bobbin having a wire receiving portion; and an armature, and winding wire directly about the portion of the half bobbin and directly about the member of the upper stator member to define a winding, wherein the armature is constructed and arranged to be magnetically attracted to at least one of the upper or lower stator members upon energizing the winding.

19. The method of claim 18, wherein the step of providing the upper stator and the half bobbin includes providing an outer periphery of the member of the upper stator member to be generally flush with an outer periphery of the portion of the half bobbin.

20. The method of claim 19, wherein the member and the portion are each generally cylindrical.

* * * * *